United States Patent [19]

Anderson

[11] Patent Number: 4,515,435
[45] Date of Patent: May 7, 1985

[54] THERMALLY STABILIZED FIBER OPTIC CABLE

[75] Inventor: Gene S. Anderson, Elburn, Ill.

[73] Assignee: Cooper Industries, Inc., Houston, Tex.

[21] Appl. No.: 406,777

[22] Filed: Aug. 10, 1982

[51] Int. Cl.³ .............................................. G02B 5/14
[52] U.S. Cl. ............................ 350/96.23; 350/96.10
[58] Field of Search ....................................... 350/96.23

[56] References Cited

U.S. PATENT DOCUMENTS

| | | | |
|---|---|---|---|
| 4,093,342 | 6/1978 | Foord et al. | 350/96.23 |
| 4,143,942 | 3/1979 | Anderson | 350/96.23 |
| 4,147,406 | 4/1979 | Anderson | 350/96.23 |
| 4,169,657 | 10/1979 | Bedard | 350/96.23 |
| 4,239,335 | 12/1980 | Stiles | 350/96.23 |
| 4,241,979 | 12/1980 | Gagen et al. | 350/96.23 |
| 4,264,129 | 4/1981 | Warkentine | 350/96.23 |
| 4,272,155 | 6/1981 | Slaughter | 350/96.23 |
| 4,304,462 | 12/1981 | Baba et al. | 350/96.23 |
| 4,331,378 | 5/1982 | Hartig | 350/96.23 |
| 4,331,379 | 5/1982 | Oestreich et al. | 350/96.23 |
| 4,374,608 | 2/1983 | Anderson | 350/96.23 |
| 4,375,313 | 3/1983 | Anderson et al. | 350/96.23 |

FOREIGN PATENT DOCUMENTS 2497964  7/1982  France .................... 350/96.23

Primary Examiner—William L. Sikes
Assistant Examiner—Brian M. Healy
Attorney, Agent, or Firm—Fitch, Even, Tabin & Flannery

[57] ABSTRACT

A fiber optic cable contains large diameter optical fibers for directly transmitting visible signals, such as those produced by water level indicators, within a steam boiler. The fibers are each sheathed in an extruded layer of polymeric material that remains soft over an operable temperature range of the cable, and the sheathed fibers are cabled in a long lay length about an axial core member that has a coefficient of thermal expansion similar to that of the optical fibers in order to restrain the sheaths, which generally have significantly different thermal coefficients of thermal expansion, from excessively expanding or contracting relative to the fibers. The cabled, sheathed fibers are wrapped in tape, and an inner jacket, which holds the sheathed fibers in compression, is extruded around the tape. Tensile strength is provided by braided yarn surrounding the inner jacket, and crush strength is provided by an outer jacket surrounding the braided yarn.

20 Claims, 2 Drawing Figures

THERMALLY STABILIZED FIBER OPTIC CABLE

The present invention relates to improved fiber optic cable and more particularly to a fiber optic cable with optical fibers that individually directly transmit visible light signals.

BACKGROUND OF THE INVENTION

The most frequent use of optical fibers is to transmit modulated communication signals from a signal generator to a signal receiver. Optical fibers for transmitting such signals are generally quite thin, typically with fiber cores ranging from about 50-300 micrometers in diameter. A substantial amount of art exists relating to fiber optic cables which protect such optical fibers from various stresses to which they might be subjected, for example, my U.S. Pat. Nos. 4,143,942 and 4,147,406.

A somewhat less frequent use of fiber optic cables is for direct transmission of a light signal to be directly observed. In monitoring certain operations, the accepted safe test methods may require direct reading of visible light signals. In one very important application, monitoring coal-fired boilers, the only accepted method of monitoring water level is by light signal devices in which a beam of light is directed through a region which will contain water or steam depending on the water level within the boiler and through a prism which causes a color change at the beam target depending on the presence or absence of steam in the light transmitting region. For example, the light signal device may register a green color when water is present at the region and a red color when steam is present.

In larger boiler operations, the control room from which the coal-fired steam boilers are operated, may be substantially remote from the boiler, e.g., several floors apart. The currently accepted methods of transmitting the signal from the light signal device within the boiler are mirror arrangements, which in certain installations may be quite cumbersome, and closed circuit television camera monitors.

Fiber optic cable as a means of directly transmitting a visible light signal is more reliable and more convenient than currently used signal transmission methods. However, certain factors must be taken into account in the design of a fiber optic cable for transmitting visible light signals from a steam boiler that are different than the factors generally present in transmitting modulated optical communication signals. The fibers for transmitting a visible signal are typically much larger, e.g., 400-800 micrometers in diameter, and inherently much less flexible than optical fibers used for transmitting modulated communication signals.

A cable for transmitting a signal from a steam boiler or other extreme temperature environment is often subjected to widely different temperature environments throughout its length; for example, a cable for reading the water level within a steam boiler may be subjected to a temperature of 105° C. within the boiler area and extend to a control room passing through an outside area where the temperature may drop to −40° C. The wide temperature range to which the cable is subjected results in differential expansion of the materials which comprise the cable, and materials should be selected for use in such cable with regard to the temperature-related changes these materials have on the light transmission attentuation of the optical fibers.

Optical fibers consist of a central glass core, through which the light rays are actually transmitted, and means to retain the light within the central core, such as a surrounding cladding having a lower refractive index than the core so that a core-cladding interface tends to reflect rays back into the core rather than penetrate the barrier to become lost from the optical fiber. The transmittance of the optical fiber depends to a large extent on the uniformity of the core-cladding interface. Light transmitting through an optical fiber travels in different modes, that is, at differing angles with respect to the axis of the core. Lower order light modes pass through the fiber at minimum angles with respect to the core axis, striking the core-cladding interface at low incident angles and reflecting back into the core. Higher order light modes pass through the fiber at greater angles with respect to the axis of the core, and hence strike the interface at greater incident angles and also travel a greater total distance through the fiber. These factors contribute to higher order light modes being relatively quickly lost from the fiber while lower order modes may pass through a substantial fiber length without significant attenuation. The light transmission attenuation of an optical fiber is a function of the uniformity of the core-cladding interface because distortions in this interface regenerate more easily attenuated higher order light modes from lower order light modes.

Light attenuating distortions in the core-cladding interface may arise if the cable's optical fibers are subjected to differential stress throughout their length. Differential stresses on the fibers may arise when the cable is subjected to wide temperature variations throughout its length as a result of differential thermal expansion and contraction of the various materials of which the core is formed according to their various coefficients of thermal expansion. The differential stresses may either be radial, as a result of surrounding cable material pressing inwardly differentially on the optical fibers, or longitudinally, as a result of surrounding material expanding or contracting differentially relative to the optical fibers. For a cable which is to be subjected to wide temperature swings throughout its length, it is necessary to isolate the optical fibers from the effects of differential expansion and contraction of the materials as much as possible to minimize attenuation of light transmitted through the fibers.

SUMMARY OF THE INVENTION

A fiber optic cable for directly transmitting visible light signals has a plurality of optical fibers that are each sheathed in an extruded layer of polymeric elastomer that is relatively soft and compressible throughout an operable temperature range of the cable. The sheathed fibers are cabled in a long lay length around an axial core member that adds some tensile strength to the cable and has a coefficient of thermal expansion matched to that of the optical fibers so as to thermally stabilize the fiber sheaths, which are pressed thereagainst, holding them against differential thermal expansion or contraction relative to the fibers, preventing longitudinal stresses on the fibers, that would otherwise result. Tape is wrapped around the cabled, sheathed fibers, and an inner jacket, which shrinks during formation to compress the sheaths towards the rigid axial core, is extruded therearound. High strength yarn is braided around the inner jacket providing tensile strength to the cable, and an outer jacket of rigid poly-

DETAILED DESCRIPTION OF THE PREFERRED EMBODIMENT

Figure 1:
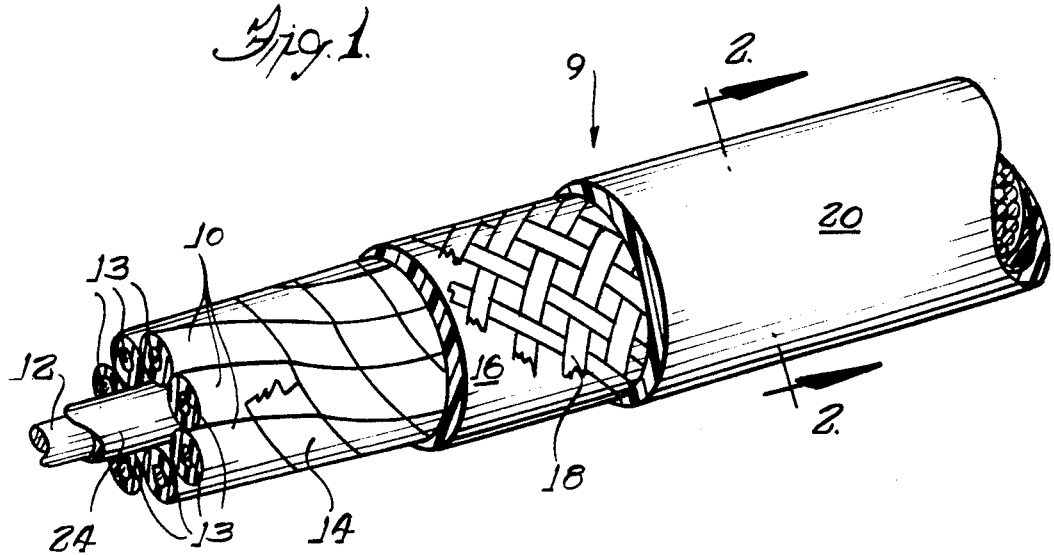
FIG. 1 is a perspective view of an optical cable embodying various features of the present invention, cut away to reveal the several layers.
Figure 2:
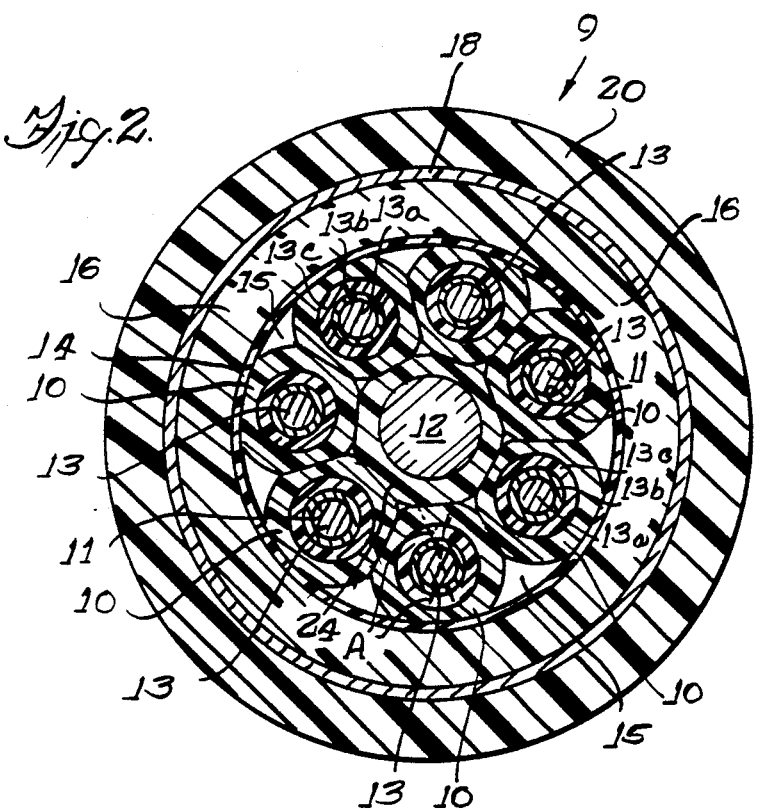
FIG. 2 is an enlarged cross-sectional view of the optical cable taken along line 2—2 of FIG. 1.

In accordance with the present invention, an optical cable 9 is provided containing a plurality of optical fibers 13, each having a relatively large diameter for transmission of a visible optical signal, the cable 9 being formed so that the individual optical fibers are not subjected to excessively uneven stresses over their length even as the cable is subjected to widely different temperature environments over its length. The optical fibers 13 are each sheathed in a protective layer 10 of a polymeric elastomeric material that is soft and resilient over the operable temperature range of the cable so as to cushion the optical fibers against differential radial compressive forces exerted by other cable members as they expand and contract within the different temperature environments through which the cable 9 extends. The sheathed fibers 13 are cabled in a long lay length around an axial core member 12, which is relatively rigid and non-compressible and has a coefficient of thermal expansion closely matched to that of the optical fibers 13. An inner jacket 16 of polymeric material, more rigid than the elastomer which forms the sheaths 10, is extruded around the cabled, sheathed fibers 13. The inner jacket polymeric material has properties such that after extrusion at high temperature, it shrinks radially inward during cooling exerting compression on the sheathed fibers to press the sheaths 10 inward toward the axial core member 12, which is rigid and is generally sheathed in an extruded layer 24 of soft, resilient polymeric material similar to the elastomer of which the fiber sheaths are formed. The tightly packed and compressed fiber sheaths 10 are restrained by the axial core member 12 against differential thermal expansion or contraction relative to the optical fibers 13 and, therefore, do not subject the fibers to varying longitudinal tensile forces as the cable 9 extends through environments of widely different temperatures and thus do not produce localized distortions in the fiber 13. A braid 18 of high tensile strength yarn surrounds the inner jacket 16, providing the cable 9 with substantial tensile strength and insuring that the fibers 13 are not elongated to the point of failure when the cable 9 is subjected to external tensile forces. An outer jacket 20 of rigid polymeric material extruded over the braid 18 protects the fibers 13 from external radial forces which might crush the fibers.

The illustrated optical fibers 13 each consists of a glass (fused silica) core 13a through which the light signal is actually transmitted, a clear silicone material 13b surrounding the fiber which has a refractive index lower than the refractive index of the glass core, providing a light barrier at the glass-silicone interface 11 that reflects light back into the core 13a from the glass-silicone interface and an outer layer 13c of polymeric material, such as a fluorocarbon sold under the trade name Tefzel, that protects the soft silicone layer. This optical fiber is commercially available, and comprises no part of the present invention.

The optical fibers 13 are each intended to transmit a single visible light signal, and in order to maximize light transmittance, relatively large diameter optical fibers 13 are used, e.g., having light-transmitting cores between about 400 and about 800 micrometers in diameter and typically about 600 micrometers in diameter. Larger diameter optical fibers are less flexible than the smaller diameter optical fibers typically used in modulated optical communication signal transmission, requiring that the cable 9 be protected from excessive bending, hence, optical cable having large diameter optical fibers 13 have correspondingly large minimum bending radii, typically above about 30 cm.

In order that the cable 9 may be bent, the optical fibers 13 are disposed in a spiraling configuration, and herein, the fibers 13 are preferably cabled in a single layer around the axial core member 12. It is a well known phenomena that optical fibers ultimately fail from surface flaws or imperfections in the fiber that propagate when the cable is subjected to stress; and herein, minimization of bending stress is achieved through a long fiber lay length, i.e., the axial distance in which each fiber completes one complete spiral. For an optical cable using relatively large diameter optical fibers, the lay length is less than one half the minimum bending radius of the cable, e.g., for a cable with a minimum radius of 30 cm, the lay length is about 15 cm. The longer the lay length of the optical fiber, the larger the minimum bending radius of the cable, and so that the cable is not excessively stiff, the lay length will generally be less than about 50 cm.

An important aspect of the invention is that the layer 10 of elastomer in which each optical fiber 13 is sheathed, is soft and compressible over the entire operable temperature range of the cable in order to cushion the fibers against differential radial forces exerted by other cable members. If the sheathing elastomer should harden at low temperatures and lose its elastomeric characteristics, the sheaths 10 would not cushion the fibers from radial compressive forces and might themselves exert significant radially inward pressure on the optical fibers 13 as they contract, seriously attentuating the light transmittance characteristics of the fibers. For purposes of this invention, the Shore A of the elastomer is between about 64 and about 68 at 23° C., 10 sec as measured on an ASTM D2240-Durometer. Fiber optic cable 9 is typically expected to perform when subjected to temperatures as low as −20° C. and sometimes to temperatures as low as −40° C., and the elastomer should not become brittle or lose its resiliency at these low temperatures. Thus, for purposes of this invention, the dynamic temperature range of the elastomer is typically between about −20° C. and about 105° C. and preferably between about −40° C. and about 105° C.

The sheaths 10 are formed around the fibers 13 by extrusion and are in intimate surface contact with the fibers. Suitable polymeric elastomers for extruding as sheaths 10 around the optical fibers include thermoplastic rubbers, such as those described in U.S. Pat. No. 4,340,704. One elastomer which has been found to be particularly suitable for fiber sheathing is a styrene-ethylene-butylene-styrene block polymer sold under the tradename Shell Elexar Rubber, grade 8431Z, which has a dynamic temperature range of from −75° C. to 105° C.

Extruded polymeric elastomer having sufficient softness and resiliency to be used as sheaths 10 for the optical fibers 13 generally have coefficients of thermal expansion that are vastly different than the thermal expansion coefficient of the optical fibers 13, the thermal expansion coefficient of the sheathing elastomer typically being about fifteen times as great as that of the optical fiber. Differential expansion or contraction would tend to place the optical fibers 13 under varying longitudinal or axial stress forces at various temperatures creating distortions of the glass-silicone interface 11, thereby attentuating the optical transmission of the fibers. Very substantial longitudinal stresses created by differential thermal expansion of the sheaths relative to the fibers might also kink or break the fibers. Preferably, the sheaths 10 are extruded around the optical fibers in a manner so as not to subject the fibers to any longitudinal stress at about room temperature (20° C.), a temperature close to the midpoint of a −40° C.-105° C. operable cable temperature range, whereby the core member acts to prevent differential contraction of the sheaths at lower temperatures and differential expansion of the sheaths at higher temperatures.

Differential thermal expansion of the fiber sheaths relative to the fibers is controlled through the use of the axial core member 12 having a coefficient of thermal expansion closely matched to that of the optical fibers 13, and preferably the thermal expansion coefficient of the core member is between about 0.8 and about 3.5 times that of the optical fibers. The core member 12 is relatively rigid and substantially non-compressible, and the fiber sheaths 10 are compressed inward toward the axial core member 12 by the inner jacket 16, whereby they are restrained against longitudinal contraction or expansion relative to the core member 12.

A preferred core member 12 is formed of a fiberglass-epoxy composite in which parallel glass fibers are impregnated with an epoxy resin forming a solid, relatively rigid member. Because of its rigidity, the thickness of this composite is limited within the cable 9 so that the cable is not unduly stiff, and herein, the thickness of the composite is minimized through the use of the single axial core member 12 to stabilize the sheaths 10 of all of the cabled fibers 13 therearound against excess thermal expansion or contraction. The axial core member 12 stiffens the cable 9 considerably less than would a plurality of thermal stabilizing members each associated with an individual fiber sheath and disposed radially outward of the cable axis. In order to perform its thermal stabilizing function, the cross-sectional area of the core is generally at least about 1 mm in diameter, and so that the cable 9 is not excessively stiff, the maximum diameter of a fiberglass-epoxy core member is not more than about 2 mm. in diameter. The precise thickness of the core 12 will be determined by the number and thicknesses of the sheathed fibers 13, and the core is typically between about one half and about one and one half times the sum of the cross-sectional areas of the glass cores 13a of the fibers.

The use of fiberglass-epoxy composite core member 12 is in contrast to aramid yarn core members frequently used in optical cables. The fiberglass-epoxy core member is substantially non-compressible whereas an aramid yarn core member is readily compressible and would not exert the required stabilization on the sheaths. Also, the composite core member has a positive coefficient of thermal expansion, similar to that of the optical fibers, whereas aramid yarn has a negative coefficient of thermal expansion.

It is preferred that the cabled fibers 13 comprise a single layer around the axial core 12 with the individual fibers sheaths pressed tightly against adjacent fiber sheaths. The cable may have from about 3 to about 20 polymer-sheathed optical fibers 13 spiraled around the core member 12 and typically has 6 to 9 optical fibers. As mentioned above, the diameter of the thermally-stabilizing core is limited due to its rigidity, and while in a cable with a very small number of fibers, the sheathed fibers might be cabled directly around the axial core member 12 forming a single, closely packed layer of sheathed fibers, if a larger number of optical fibers are used, it is generally necessary that the core have a greater effective diameter to accomodate the larger number of sheathed fibers in a single layer. The effective diameter of the axial core member 12 is increased by the optional elastomer layer 24, preferably formed of the same elastomeric material or a material having substantially similar characteristics to that which is used to form the fiber sheaths 10. The elastomer layer 24 is extruded as a sheath around the axial core 12 so as to be in intimate surface contact therewith. The core sheath 24, like the fiber sheaths 10, is held under compression by the inner jacket 16 so that the core sheath is restrained against differential thermal expansion relative to the core member, and the core sheath, in turn, restrains the fiber sheaths 10 against differential thermal expansion relative to the core member 12 and to the optical fibers 13.

The inner jacket 16 which preferably holds the fibers sheaths 10 and core sheaths 24 under uniform compression at uniform temperature, is formed of an extruded layer of polymeric material, such as polyvinyl chloride, which is substantially more rigid than the elastomer of which the fiber and core sheaths 10, 24 are formed. The material of which the inner jacket is formed should have a Shore D of between about 34 and about 39 as measured on an ASTM D2240 Durometer at 23° C., 10 sec. It should have a dynamic temperature range consistent with the operable temperature range of the cable, i.e., either −20° C.-105° C. or −40° C.-105° C. Its minimum mandrel bend temperature, i.e., the lowest temperature at which it can be bent without breaking or kinking, should be at or below the lower end of the temperature range and preferably is about 20° below the lower end of the temperature range. The inner jacket is typically between about 0.75 and about 1.5 mm thick.

Prior to extruding the inner jacket 16, the wrap 14, which may be formed from tape, such as polyester tape sold under the tradename Mylar, is spiraled around the sheathed, cabled fibers 13, preventing the inner jacket material from entering the interstices 15 between the fiber sheaths 10 and assuring that the inner jacket 16 has a well defined, generally circular interior wall that may be stripped away by standard techniques when splicing or terminating the cable 9. The polyester tape 14 is tightly wrapped so as to place the sheaths 10 in compression against the core. As the inner jacket 16 cools after extrusion, it shrinks, reducing its interior diameter and compressing the sheaths 10, 24 between the inner jacket and the axial core 12. The shrinkage is preferably sufficient to aid the tape 14 in placing the elastomeric sheaths 10, 24 under sufficient compression to be restrained by the axial stabilizing core 12 but not so much that undue compressive stress is exerted on the fibers, and for purpose of this invention the inner jacket material is selected and applied so that its interior diameter is reduced during cooling from the extrusion temperature to room temperature (20° C.) by about 0.1 to about 5 percent.

As a result of the tight winding of the tape 14 and the inward contraction of the inner jacket during cooling, the fiber sheaths 10, which are originally annular in cross section, are deformed to be in substantially greater than line contact with both the inner jacket 16 and the core 12 or the core sheath 24. Preferably the inward compression of the tape 14 and the inner jacket 16 is sufficient so that the fiber sheaths 10 are in surface contact with the inner jacket for at least about 30° (angle A) of their surfaces, as measured from the longitudinal axes of the fibers, and in a like amount of surface contact with the core 12 or the core sheath 24. Preferably, each fiber sheath 10 is also in surface contact for at least about 30° with each of the two adjacent optical fiber sheaths. To achieve the desired degree of surface contact, the fiber sheaths, are sufficiently thick and sufficiently compressive to provide for adequate deformation in response to the compression exerted by the inner jacket 16. To this end, the thickness of each of the fiber sheaths 10 is between about 0.4 and about 1 times the diameter of the fiber 13, including its outer layer 13c. The elastomer has a modulus of elasticity (which generally corresponds to the extent to which an elastomer may be compressed) of between about 63 and about 78 kg/cm$^2$ at 23° C. The substantial surface contact of the closely packed sheaths 10 with the core member 12 or with its sheath 24 helps to restrain the sheaths from independent thermal contraction or expansion relative to the core member.

Although the compression of the sheaths 10 by the tape 14 and the inner jacket 16 does exert some radially compressive forces to the optical fibers 13, this stress is minimized by the cushioning of the elastomeric sheaths and, importantly, is generally uniform throughout the length of the cable, whereby point distortions are not formed at the glass-cladding interfaces 11. The elastomeric nature of the fiber sheaths 10 act to shield the fibers 13 from the variations in radial constrictive force exerted by the inner jacket 16 subjected to the different temperature environments.

The braided strength member 18 extends the full length of the cable 9 and has a breaking strength greater than the breaking strength of the optical fibers 13. The axial loading to which the cable 9 is subjected is carried primarily by the braided strength member rather than by subjecting the optical fibers to undesirably high tensile forces. The braided strength member 18 is preferably braided from a high-strength yarn, e.g., formed from a suitable aramid, such as that sold under the tradename Kevlar.

The rigidity of the inner jacket 16 tends to isolate the optical fibers 13 from any compressive forces exerted by the braided strength members 18. Such compressive forces may occur as the braided strength member tends to radially constrict as it tends to axially elongate when subjected to tensile stress. To reduce the tendency of the braid to axially elongate when subjected to tensile stress, it is preferred that the yarn 18 be braided very tightly around the extruded inner jacket 16.

The outer jacket 20 is extruded around the braid 18, firmly retaining the braid between it and the inner jacket 16. The outer jacket 20 is preferably formed of a polymeric material, such as high-density polyethylene, having sufficient rigidity to resist external forces which might tend to crush the cables and cause optical fiber failure. The outer jacket further stiffens the cable 9 against bending, helping to define the minimum bending radius of the cable and assuring that the individual fibers 13 are not bent to the point of failure during and subsequent to installation of the cable. A polymer suitable for forming the outer jacket should have a Shore D between about 60 and about 66 as measured on an ASTM D2240-Durometer at 23° C., 10 sec., a dynamic temperature range corresponding to the operable temperature range of the cable, a mandrel bend minimum temperature at or below the lower end of this operable temperature range of the cable and preferably about 20° C. lower than the operable temperature range. The outer jacket is typically between about 1.5 and about 2.5 mm. thick.

By way of example, an optical cable 9 has seven optical fibers 13 cabled about an axial core member 12. The glass cores 13a of the optical fibers 13 are each 600 micrometers in diameter, the outside diameter of the silicone cladding 13b is 750 micrometers and the outside diameter of the surrounding Tefzel layer 13c is 1050 micrometers (1.05 mm). Each composite fiber 13 is coated with an extruded sheath 10 of Shell Elexar Rubber, grade 8431Z, having an outside diameter of 2 mm. The axial core member 12 consists of a fiberglass-epoxy composite center, 1.2 mm. in diameter, and an outer sheath layer 24 formed of the same material of which the fiber sheaths 10 are formed and having a non-compressed outside diameter of 2.7 mm. The optical fibers 13 have a coefficient of thermal expansion of $4.9 \times 10^{-7}$ cm/cm/°C., and the fiberglass-epoxy composite has a coefficient of thermal expansion of $3.4 \times 10^{-6}$ cm/cm/°C. The cabled, sheathed fibers are wrapped in Mylar polyester tape having a thickness of about 0.1 mm., and a polyvinyl chloride inner jacket 16 having a Shore D hardness of 36 at 23° C., 10 sec, is extruded therearound. After shrinkage during cooling, the inner jacket 10 has an outside diameter of 9.0 mm. and an average inside diamater of 6.7 mm. A Kevlar yarn is braided around the inner jacket 16, and an extruded outer jacket 20 of Bakelite DGDJ-3364 Black high-density polyethylene which has an inside diameter of 9.5 mm and an outside diameter of 11.6 mm is extruded over the braid.

The invention provides an optical cable particularly suitable for carrying the relatively large diameter optical fibers that are highly preferred for transmitting visible light signals directly from a light source. The relatively large diameter optical fibers are protected from excess bending stress by their long lay length about the core member, and from excess tensile stress by the axial core member and the braided strength member. Fiber sheathing material that remains soft and resilient throughout the operable temperature range of the cable exerts minimal radial compressive forces on the optical fibers, even at low temperatures. The fibers are protected further against the radial compressive forces by the inner jacket which resists radial constriction of the braided strength member. Differential thermal expansion of the polymeric sheathing material and the optical fiber, which would tend to subject the fibers to axial stress when the cable is subjected to wide temperature variations, is mediated by the stabilizing core member around which the sheathed fibers are cabled.

While the invention has been described in terms of a preferred embodiment, modifications obvious to one having ordinary skill in the art may be made without departing from the scope of the invention.

Various features of the invention are set forth in the following claims.

What is claimed is:

1. A fiber optic cable for directly transmitting a visible optical signal comprising
    a plurality of relatively large diameter optical fibers each having a light-transmitting core and means therearound providing an interface that reflects incident light back into said core,
    a sheathing layer of elastomeric polymeric material around each optical fiber in intimate contact with the outer surface of said optical fiber, said elastomeric polymeric material being resiliently compressible, having a modulus of elasticity of between about 63 and about 78 kg/cm$^2$ at 23° C., having a Shore A of between about 64 and about 68 at 23° C., 10 sec and having a dynamic temperature range of from about −20° C. or below to about 105° C. or above,
    an axial core including a rigid, substantially non-compressible axial member having a coefficient of thermal expansion closely matched to the coefficient of thermal expansion of said optical fibers, said axial core being located along the center axis of the cable and extending longitudinally along the center axis of the cable, said sheathed optical fibers being cabled around said axial core in a lay length of between about 15 and about 50 cm,
    said sheathing layers being compressed against said axial core to be deformed thereby over an extended surface contact with the axial core, said sheathing layers being compressed against adjacent sheathing layers to be deformed from a circular cross section, and
    a jacket surrounding said sheathed fibers formed of polymeric material substantially more rigid than said elastomeric polymeric material having a Shore D of between about 34 and about 39 at 23° C., 10 sec and a dynamic temperature range of from about −20° C. or below to about 105° C. or above, said sheathed fibers being held in compression against said axial core by said jacket, whereby said axial core stabilizes said polymeric material layers against differential thermal expansion and contraction relative to said optical fibers.

2. A fiber optic cable according to claim 1 wherein said axial member has a coefficient of thermal expansion between about 0.8 and about 3.5 times that of said optical fibers.

3. A fiber optical cable according to claim 1 wherein said axial member has a cross-sectional area between about one-half and about one and one-half times that of the total cross-sectional areas of the light-transmitting cores of said optical fibers.

4. A fiber optical cable according to claim 1 wherein said axial member comprises a composite of glass fibers impregnated with an epoxy resin, said member having a diameter between about 1 and about 2 mm.

5. A fiber optical cable according to claim 1 wherein said sheathed optical fibers are compressed against said core so as to make contact with said core over about 30° of the surface of each sheath as measured from the longitudial axis of the optical fiber.

6. A fiber optic cable according to claim 1 wherein said light-transmitting cores of said optical fibers have diameters between about 400 and about 800 micrometers.

7. A fiber optic cable according to claim 1 wherein said elastomer and said substantially more rigid polymeric material have dynamic temperatures ranges of from about −40° C., or below to about 105° C. or above.

8. A fiber optic cable according to claim 1 wherein said more rigid polymeric material is polyvinyl chloride.

9. A fiber optic cable according to claim 1 wherein said sheathed cables are surrounded by a tightly wound wrap, and said jacket surrounds said wrap.

10. A fiber optic cable according to claim 9 wherein said wrap is Mylar polyester tape.

11. A fiber optic cable according to claim 1 wherein said jacket is extruded at elevated temperatures around said cabled, sheathed fibers and shrinks during cooling so that its inside diameter is reduced by between about 0.1 percent to about 5 percent during cooling to 20° C.

12. A fiber optic cable according to claim 1 wherein said sheathing layer places no longitudinal stress on said fiber at about 20° C.

13. A fiber optic cable according to claim 1 wherein said sheathing layers are formed of an extruded thermoplastic rubber.

14. A fiber optic cable according to claim 1 wherein said axial member has an outer sheathing in intimate contact therewith, said outer sheathing having an outside diameter such that said sheathed fibers are arranged in a single layer around said core with said sheathed fibers in surface contact with each other.

15. A fiber optic cable according to claim 13 wherein said outer sheathing is formed of polymeric material having properties substantially similar to the elastomer of which said sheathing layers are formed.

16. A fiber optic cable according to claim 1 wherein said jacket is surrounded by tensile strength member.

17. A fiber optic cable according to claim 16 wherein said strength member is a braid of high tensile strength yarn.

18. A fiber optic cable according to claim 17 wherein said yarn is an aramid yarn.

19. A fiber optic cable according to claim 15 including an outer jacket around said strength member, said outer jacket being formed of a rigid polymeric material having a shore D of between about 60 and about 66 at 23° C., 10 sec and a dynamic temperature range encompassing said dynamic temperature range of said elastomer.

20. A fiber optic cable for directly transmitting a visible optical signal comprising,
    a plurality of optical fibers each having a light-transmitting core and means therearound providing an interface that reflects incident light back into said core, said light-transmitting cores of said fibers having diameters of between about 400 and about 800 micrometers,
    a sheathing layer of flexible elastomeric polymeric material around each optical fiber in intimate contact with the outer surface of said optical fiber, said elastomeric polymeric material being resiliently compressible, said sheathing layers each being compressed against a pair of adjacent sheathing layers to deform the outer surfaces thereof from a circular surface at the areas of contact therebetween, a centrally located core extending longitudinally along a central axis for the cable and including a rigid, substantially non-compressible axial member having a cross-sectional area between about one-half and about one and one-half times that of the total cross-sectional areas of said light-transmitting cores, said axial member having a coefficient of thermal expansion between about 0.8 and about 3.5 times that of said optical fibers, said sheathed optical fibers being cabled around said axial core in a lay length of between about 15 and about 50 cm, said sheathed optical fibers being compressed against said axial core so that each of said fiber-sheathing layers make contact with said axial core over a surface greater than a tangential line of contact, an inner jacket surrounding said sheathed fibers formed of a polymeric material that is substantially more rigid than said elastomeric polymeric material, said sheathed fibers being held in compression against said axial core by said inner jacket to hold the same against differential thermal expansion and contraction relative to said optical fibers, a tensile strength member comprising a high tensile strength yarn braided around said inner jacket, and an outer jacket around said tensile strength member, said outer jacket being formed of a rigid polymeric material.

* * * * *